(12) United States Patent
Kamada et al.

(10) Patent No.: US 7,704,182 B2
(45) Date of Patent: Apr. 27, 2010

(54) AUTOMATIC TRANSMISSION

(75) Inventors: Shinya Kamada, Hiroshima (JP); Junichi Doi, Hiroshima (JP); Takamichi Teraoka, Hiroshima (JP); Tokimori Saka, Hiroshima (JP); Shinya Yamamoto, Hiroshima (JP); Tatsuhiko Iwasaki, Hiroshima (JP); Tatsutoshi Mizobe, Hiroshima (JP); Hideo Toyota, Hiroshima (JP); Naohiro Sakaue, Hiroshima (JP); Norio Iwashita, Hiroshima (JP)

(73) Assignee: Mazda Motor Corporation (JP)

( * ) Notice: Subject to any disclaimer, the term of this patent is extended or adjusted under 35 U.S.C. 154(b) by 360 days.

(21) Appl. No.: 11/876,927

(22) Filed: Oct. 23, 2007

(65) Prior Publication Data

US 2008/0113845 A1 May 15, 2008

(30) Foreign Application Priority Data

Nov. 15, 2006 (JP) .............................. 2006-308537

(51) Int. Cl.
*F16H 3/62* (2006.01)
(52) U.S. Cl. ...................................... 475/276
(58) Field of Classification Search ........................ None
See application file for complete search history.

(56) References Cited

U.S. PATENT DOCUMENTS

| 6,176,802 | B1 | 1/2001 | Kasuya et al. |
| 6,716,130 | B1 | 4/2004 | Bucknor et al. |
| 2002/0142880 | A1 | 10/2002 | Hayabuchi et al. |
| 2007/0111843 | A1 | 5/2007 | Ziemer |

FOREIGN PATENT DOCUMENTS

| DE | 103 15 709 | 10/2004 |
| FR | 2 885 664 | 11/2006 |
| WO | WO 2007 000521 | 1/2007 |

OTHER PUBLICATIONS

A European Search Report Application No. EP 07 02 1347 dated on Jan. 9, 2008.

*Primary Examiner*—Dirk Wright
(74) *Attorney, Agent, or Firm*—Studebaker & Brackett PC; Donald R. Studebaker

(57) ABSTRACT

On an input shaft are provided in order from a side of an engine a torque converter with a lock-up clutch, a first planetary gear set as a multiplying mechanism, a counter drive gear outputting a rotational drive force to a countershaft, a second planetary gear set as a speed-change element, a third planetary gear set as a speed-change element. Accordingly, there can be provided an automatic transmission for six forward speeds with plural planetary gear sets, clutches and brakes that can properly reduce a clutch capacity and restrain gear noises with its compact and light-weighted structure.

17 Claims, 10 Drawing Sheets

← Vehicle Forward

|          | 1   | 2   | 3   | 4   | 5   | 6   | R   |
|----------|-----|-----|-----|-----|-----|-----|-----|
| C1 (Low/C) | ● | ● | ● | ● |   |   |   |
| C2 (High/C) |   |   |   | ● | ● | ● |   |
| C3 (3/5/R C) |   |   | ● |   | ● |   | ● |
| B2 (L/R Br.) | (●) |   |   |   |   |   | ● |
| B1 (2/6 Br.) |   | ● |   |   |   | ● |   |

FIG. 3

FIG. 4A Speed Line Diagram

|     | Sun Gear (Zs) | Ring Gear (Zr) | Pinion (Zp) | Sun/Ring Ratio |
|-----|---------------|----------------|-------------|----------------|
| G1  | 48            | 87             | 20          | 1.813          |
| G2  | 55            | 89             | 17          | 1.618          |
| G3  | 41            | 91             | 25          | 2.220          |

FIG. 4B Gear Tooth Number

|  | 1 | 2 | 3 | 4 | 5 | 6 | R |
|---|---|---|---|---|---|---|---|
| Low/C (C1) | 1 | 1 | 0.666 | 0.285 | 0 | 0 | 0 |
| High/C (C2) | 0 | 0 | 0 | 0.461 | 0.806 | 0.644 | 0 |
| 3/5/R C (C3) | 0 | 0 | 0.334 | 0 | 0.250 | 0 | 1 |
| L/R Br. (B2) | 1.618 | 0 | 0 | 0 | 0 | 0 | 3.220 |
| 2/6 Br. (B1) | 0 | 0.503 | 0 | 0 | 0 | 0.200 | 0 |

FIG. 10

AUTOMATIC TRANSMISSION

BACKGROUND OF THE INVENTION

The present invention relates to an automatic transmission, and particularly relates to an automatic transmission that provides six forward speeds with plural planetary gear sets, clutches and brakes.

An automatic transmission that can provide a multi-speed shift by combining plural planetary gear sets, clutches and brakes is known.

Recently, an automatic transmission with six forward speeds has been demanded for improving a fuel economy or drivability.

Herein, gear trains of such an automatic transmission need to be properly compact because a layout space of the transmission is rather limited.

For example, U.S. Pat. No. 6,176,802 has proposed such a kind of automatic transmission, in which a reduction planetary gear and a Ravigneaux-type planetary gear set (a complex-type planetary gear set with a single common carrier), which inputs a reduction rotation and a non-reduction rotation and outputs plural rotation speeds, are provided coaxially, and speed-change elements of these planetary gears are connected or disconnected with three clutches and two brakes, thereby establishing the six forward speeds.

The above-described automatic transmission can prevent the size of rotational members from being improperly large and restrain a shift shock by reducing an inertia torque, in addition to its light weight and compactness, with its structure in which two clutches are respectively disposed on both sides of the Ravigneaux-type planetary gear set.

Although the above-described automatic transmission provides the light weight, compactness and small inertia torque, it has a problem in that since an increased drive torque is transmitted to the downstream clutches and the like because of a reduction function by the reduction planetary gear, a clutch capacity would be made large enough for this increased drive torque.

Further, the planetary gear set and other members that form the downstream gear trains may need a large torque capacity as well, so the size of the gear trains would become large inevitably.

Moreover, since this automatic transmission needs to use a long pinion that extends in an axial direction for the Ravigneaux-type planetary gear set, there is a problem in that the drive torque transmission with this long pinion would cause an improper inclination of gears which generates gear noises.

SUMMARY OF THE INVENTION

Accordingly, an object of the present invention is to provide an automatic transmission for six forward speeds with plural planetary gear sets, clutches and brakes that can properly reduce the clutch capacity and restrain gear noises with its compact and light-weighted structure.

According to the present invention, there is provided an automatic transmission, comprising an input shaft, an output portion, the output portion being provided so as to be coaxial with the input shaft, a transmission case, a first single-pinion-type planetary gear set including a first sun gear, a first carrier, and a first ring gear, a second single-pinion-type planetary gear set including a second sun gear, a second carrier, and a second ring gear, a third single-pinion-type planetary gear set including a third sun gear, a third carrier, and a third ring gear, a first clutch operative to connect or disconnect the input shaft with the second sun gear, a second clutch operative to connect or disconnect the first ring gear with the third carrier, a third clutch operative to connect or disconnect the input shaft with the third sun gear, a first brake operative to connect or disconnect the third sun gear with the transmission case, and a second brake operative to connect or disconnect the third carrier with the transmission case, wherein the first sun gear and the transmission case, the first carrier and the input shaft, the second ring gear and the third carrier, and the third ring gear and the second carrier and the output portion are respectively configured to be always in a connection state, and a first speed is established by the first clutch and the second brake that are respectively selected in a connection state, a second speed is established by the first clutch and the first brake that are respectively selected in a connection state, a third speed is established by the first clutch and the third clutch that are respectively selected in a connection state, a fourth speed is established by the first clutch and the second clutch that are respectively selected in a connection state, a fifth speed is established by the second clutch and the third clutch that are respectively selected in a connection state, and a sixth speed is established by the second clutch and the first brake that are respectively selected in a connection state.

According to the above-described structure, since the first sun gear and the transmission case are always in the connection state and the first carrier and the input shaft are always in the connection state, the first single-pinion-type planetary gear set outputs the rotation with an increased rotational speed, namely it can function as a multiplying mechanism. Further, since downstream speed-change elements comprises the second and third single-pinion-type planetary gear sets, the speed-change elements can be configured without the long pinion. Thereby, the drive torque transmitted to the first and second clutches that are located downstream of the first single-pinion-type planetary gear set is not increased from the input torque, and the drive torque transmitted to the downstream gear trains is not increased either. Also, since the improper inclination of gears may not occur because of no application of the long pinion, the gear noises can be restrained.

According to an embodiment of the present invention, the third speed is configured such that a rotation of the input shaft is directly transmitted to the output portion. Thereby, the rotational speed of the fourth through sixth speeds that is higher than the third speed and may be used often in the normal driving condition can be higher than that of the input shaft. Accordingly, the drive torque acting on the gear trains of the automatic transmission can be reduced as a whole, thereby reducing a load acting on the gear trains. Thus, the durability of the gear trains can be enhanced with the light-weighted and compact structure of the automatic transmission.

According to another embodiment of the present invention, the first, second and third single-pinion-type planetary gear sets are provided on the input shaft in order from one end of the input shaft that is connected to an engine, and the output portion is provided between the first single-pinion-type planetary gear set and the second single-pinion-type planetary gear set. Thereby, in a FF (front-engine front-drive) vehicle in which its engine is disposed laterally beside the transmission, the drive torque can be outputted near the engine, namely, at a central location of the vehicle. Accordingly, a countershaft connecting with a final gear can be made properly short, thereby making the automatic transmission compact further. Particularly, since only the single-pinion-type planetary gear set is disposed between the engine and the output portion other than the torque converter, the countershaft can be made shorter. Thus, a whole part of the drive system can be made compact. Herein, a drive-force transmitting means as the "output portion" may apply a gear transmission, a chain transmission, or the like.

According to another embodiment of the present invention, the first, second and third single-pinion-type planetary gear sets are provided on the input shaft in order from an end of the input shaft that is opposite to one end of the input shaft that is connected to an engine, and the output portion is provided between the first single-pinion-type planetary gear set and the second single-pinion-type planetary gear set. Thereby, when the above-described automatic transmission is applied to the front-engine front-drive vehicle with the engine disposed laterally beside the transmission, the drive torque can be outputted relatively near the engine, namely, at the central location of the vehicle. Accordingly, the countershaft connecting with the final gear can be made properly short, thereby making the automatic transmission compact further. Thus, the whole part of the drive system can be made compact.

According to another embodiment of the present invention, the first and second clutches are disposed near the first single-pinion-type planetary gear set. Thereby, a connecting member between the first single-pinion-type planetary gear set and each of the clutches can be made properly short. Thus, there can be provided a layout that is advantageous to the compactness of the automatic transmission.

According to another embodiment of the present invention, at least either one of the first and second clutches is disposed so as not to overlap with the first single-pinion-type planetary gear set in an axial direction. Thereby, the size of either one of the clutches can be made small without any restriction by the first single-pinion-type planetary gear set. Thus, the radial-direction size of at least one of the first and second clutches can be compact, thereby making the automatic transmission compact.

According to another embodiment of the present invention, the third clutch is disposed near the third single-pinion-type planetary gear set. Thereby, a connecting member between the third single-pinion-type planetary gear set and the third clutch can be made properly short. Thus, there can be provided the layout that is advantageous to the compactness of the automatic transmission.

According to another embodiment of the present invention, the third clutch is disposed so as not to overlap with the third single-pinion-type planetary gear set in an axial direction. Thereby, the radial-direction size of the third clutch can be made small without any restriction by the third single-pinion-type planetary gear set. Thus, the radial-direction size of the third clutch can be compact, thereby making the automatic transmission compact.

According to another embodiment of the present invention, the first and second brakes are disposed side by side in an axial direction outside the second and third single-pinion-type planetary gear sets. Thereby, the brakes, the torque capacity of which may not need to be cared about, can be properly located utilizing a space outside the second and third single-pinion-type planetary gear sets. Thus, this layout can be advantageous to the compactness of the automatic transmission.

Other features, aspects, and advantages of the present invention will become apparent from the following description which refers to the accompanying drawings.

DETAILED DESCRIPTION OF THE INVENTION

Hereinafter, preferred embodiments of the present invention will be descried referring to the accompanying drawings.

Embodiment 1

Figure 1:
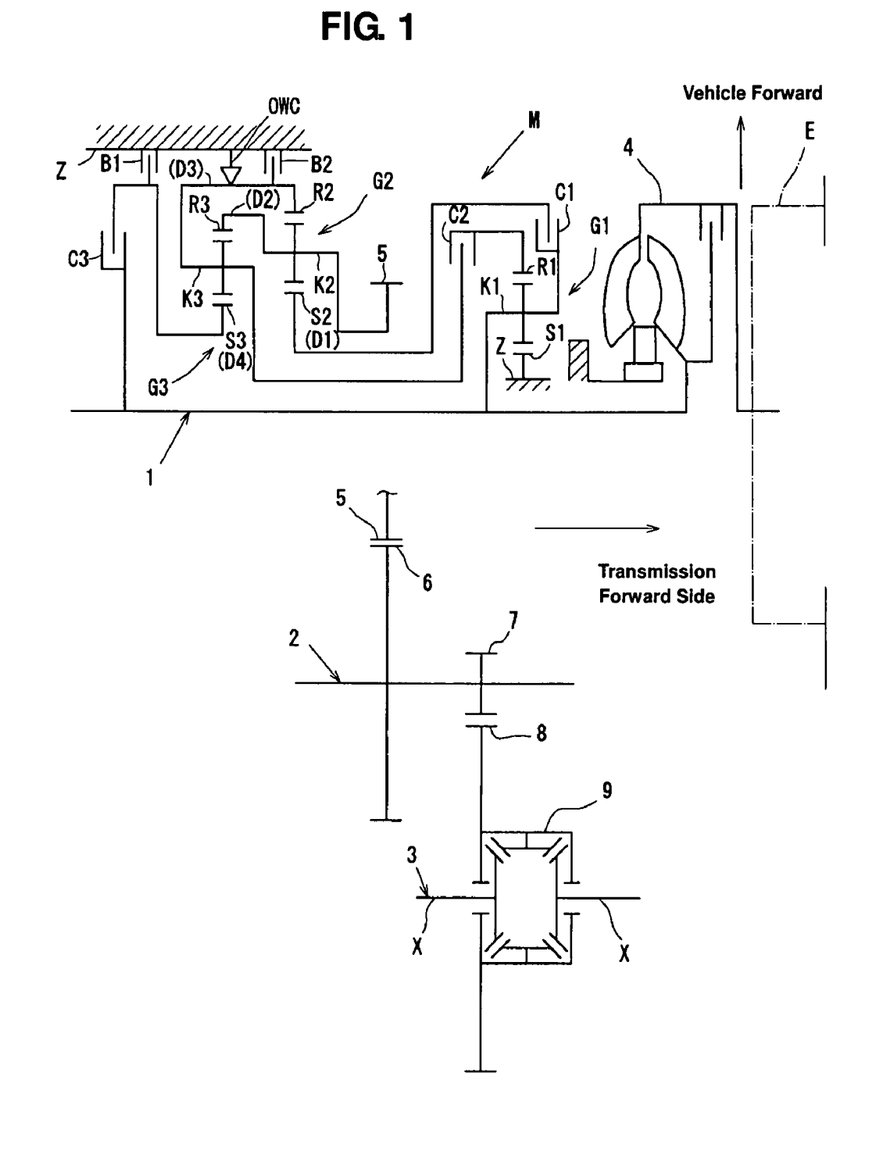
FIG. 1 is a skeleton diagram of a power train of an automatic transmission of a first embodiment according to the present invention.
Figure 2:
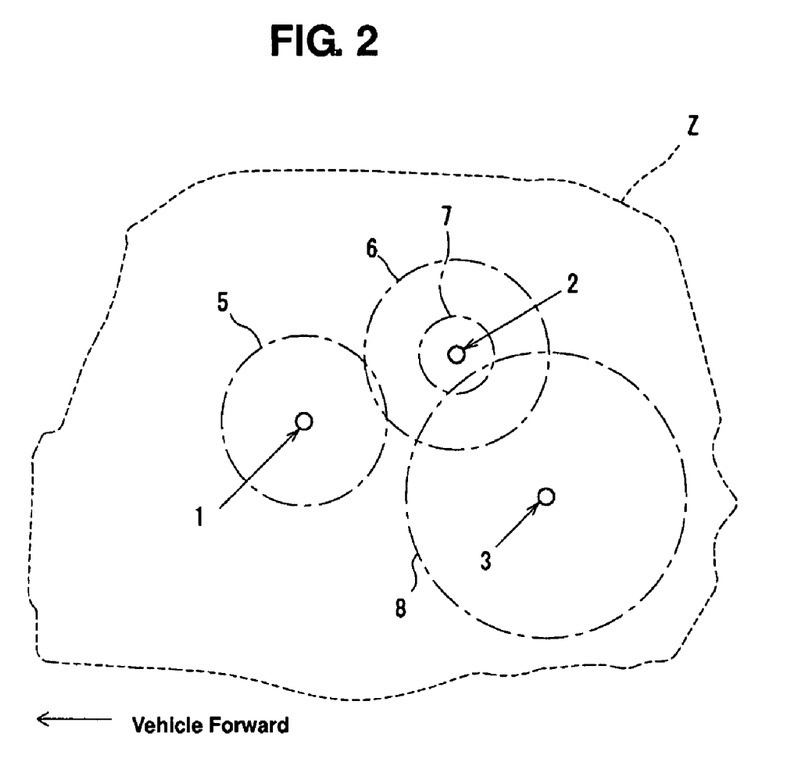
FIG. 2 is a side view showing location relationships of respective shafts of the automatic transmission.

FIG. 1 is a skeleton diagram of a power train of an automatic transmission of a first embodiment according to the present invention. FIG. 2 is a side view showing location relationships of respective shafts of the automatic transmission. This automatic transmission M is applied to a so-called FF type of power train that is disposed laterally in a vehicle as shown in FIG. 1. The automatic transmission M is a transaxle having three shafts of an input shaft 1, a countershaft 2, and a drive shaft, which are provided in a vehicle width direction. On the input shaft 1 of the automatic transmission M are provided, from a side of an engine E (hereinafter, referred to as "transmission forward side"), a torque converter 4 that is equipped with a lockup clutch, a first planetary gear set G1 that functions as a multiplying mechanism, a counter drive gear 5 that outputs a rotational drive force to the countershaft 2, a second planetary gear set G2 that forms a speed-change element, and a third planetary gear set G3 that forms a speed-change element likewise.

On the countershaft 2 are provided, from a side opposite to the engine E (hereinafter, referred to as "transmission rearward side"), a counter driven gear 6 that engages with the counter drive gear 5 and a final drive gear 7 that outputs to the drive shaft 3.

Further, on the drive shaft 3 are provided a final driven gear 8 (differential ring gear) that engages with the final drive gear 7, a differential gear device 9 that allows differential motion between right and left wheels, and right and left drive shafts X, X that transmit the rotational force to both side wheels, not illustrated, outward from the differential gear device.

These three shafts 1, 2 and 3 are provided in order of the input shaft 1, the countershaft 2 and the drive shaft 3 from the vehicle forward side as shown in FIG. 2. The countershaft 2 is disposed at a slightly higher level.

The speed-change mechanism on the input shaft 1 comprises, in addition to the above-described first, second and third planetary gear sets G1, G2, G3, a first clutch C1 that is disposed on the transmission forward side of the first planetary gear set G1, a second clutch C2 that is disposed on the transmission rearward side of the first planetary gear set G1, and a third clutch C3 that is disposed on the transmission rearward side of the third planetary gear set G3, thereby transmitting the rotational force with the speed-change elements.

Further, outside the second and third planetary gear sets G2, G3 are provided a first brake B1 and a second brake B2 that function to stop the rotation of the speed-change elements by using a transmission case Z. A one-way clutch OWC is disposed beside the second brake B2. The function of the one-way clutch OWC will be described later.

Each of the first, second and third planetary gear sets G1, G2, G3 is a single-pinion-type planetary gear that includes a sun gear, a ring gear, and a carrier supporting a single pinion. Thus, the first single-pinion-type planetary gear set G1 includes a first sun gear S1, a first ring gear R1, and a first carrier K1. The second single-pinion-type planetary gear set G2 includes a second sun gear S2, a second ring gear R2, and a second carrier K2. The third single-pinion-type planetary gear set G3 includes a third sun gear S3, a third ring gear R3, and a third carrier K3.

Next, connection relationships of the speed-change mechanism will be described. The first planetary gear set G1 is configured to output the rotation with the increased rotational speed from the first ring gear R1 by fixing the first sun gear S1 to the transmission case Z (always in a connection state) and connecting the first carrier K1 with the input shaft 1. Thus, the first planetary gear set G1 always functions as a multiplying mechanism.

In the second planetary gear set G2, the second sun gear S2 is coupled to the first carrier K1 via the first clutch C1 so as to be connected or disconnected with the first carrier K1. And, the second carrier K2 is always connected with the third ring gear R3, and the second ring gear R2 is always connected with the third carrier K3. In the third planetary gear set G3, the third sun gear S3 is coupled to the input shaft 1 via the third clutch C3 so as to be connected or disconnected with the input shaft 1. Likewise, the third carrier K3 is always connected with the second ring gear R2, and the third ring gear R3 is always connected with the second carrier K2. Accordingly, the second and third planetary gear sets G2, G3 function as a speed-change unit that can provide four degrees of freedom in total, in which the second sun gear S2 forms a first speed-change element (D1), the second carrier K2 third ring gear R3 forms a second speed-change element (D2), the second ring gear R2 third carrier K3 forms a third speed-change element (D3), and the third sun gear S3 forms a fourth speed-change element (D4).

The second speed-change element (D2) of the second ring gear R2 third carrier K3 is coupled to the first ring gear R1 via the second clutch C2 so as to be connected or disconnected with the first ring gear R1. The third speed-change element (D3) of the second carrier K2 third ring gear R3 is always connected with the counter drive gear 5.

Further, between the second speed-change element (D2) of the second ring gear R2 third carrier K3 and the transmission case Z is disposed the second brake B2 operative to stop the rotation of the third speed-change element (D3). Between the fourth speed-change element (D4) of the third sun S3 and the transmission case Z is disposed the first brake B1 operative to stop the rotation of the fourth speed-change element (D4).

The automatic transmission M equipped with the above-described elements conduct a speed-change control with a control device, not illustrated, by selecting proper speeds based on a shift operation of a driver and various signals of an engine speed, a vehicle speed, a vehicle load and so on.

Figure 3:
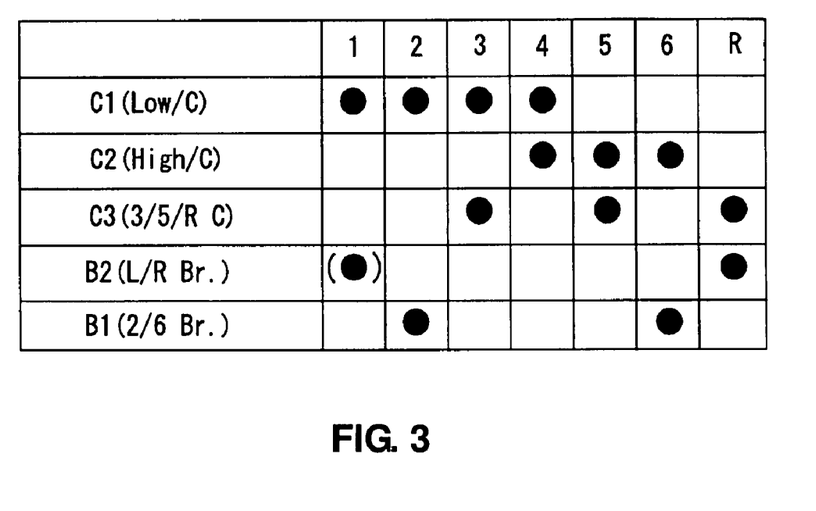
FIG. 3 is a chart showing a connection/release state of clutches and brakes.

FIG. 3 is a chart showing a connection/release state of the clutches C1, C2, C3 and the brakes B1, B2 at respective speeds (● indicates a connection state, ○ indicates a release state in the chart). Herein, the first clutch C1 is also called a Low clutch because of its connection state at the first-fourth speeds. The second clutch C2 is also called a High clutch because of its connection state at the fourth-sixth speeds. The third clutch C3 is also called a 3/5/R clutch because of its connection state at the third and fifth speeds and the reverse. The second brake B2 is also called a L/R brake because of its connection state at the first speed and the reverse. The first brake B1 is also called a 2/6 brake because of its connection state at the second and sixth speeds. Also, in the present embodiment, the one-way clutch OWC is provided beside the second brake B2, so the second brake B2 is not normally in the connection state at the first speed. This second brake B2 is made in the connection state only in a specified case, for example, when an engine brake is demanded such as a manual mode or a hold mode (for this reason, an indication with ( ) is used in the chart). Herein, in a case where the one-way clutch OWC is not provided, the second brake is made in the connection state at the first speed. Accordingly, hereinafter, the control for the case where the one-way clutch OWC is not provided will be described just for convenience.

Figure 4A:
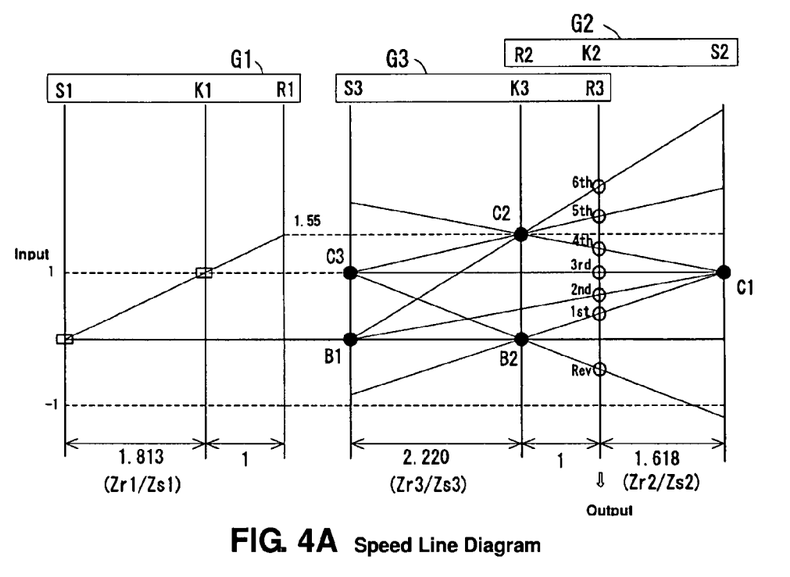
FIG. 4A is a speed line diagram showing a speed ratio of respective speed-change elements of respective speeds.
Figure 4B:
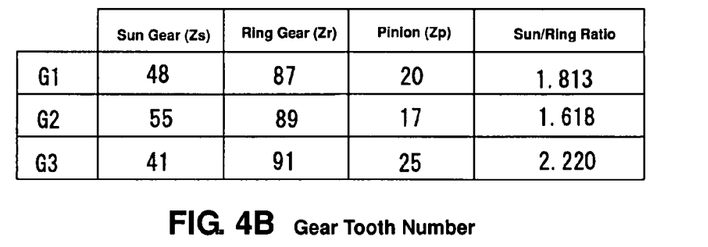
FIG. 4B is a chart showing the number of gear tooth of respective planetary gear sets.

FIG. 4A is a speed line diagram showing a speed ratio of the respective speed-change elements of the respective speeds, and FIG. 4B is a chart showing the number of gear tooth of the planetary gear sets G1, G2, G3.

First, the speed line diagram of FIG. 4A will be descried. The axis of ordinates of this diagram indicates the respective speed-change elements of the first-third planetary gear sets G1, G2, G3, and a distance between these axes in a lateral direction is determined by a gear ratio. A location on the axis of ordinates indicates a speed ratio.

Specifically, three axes on the left indicates the first sun gear S1, the first carrier K1, and the first ring gear R1 of the first planetary gear set G1. Four axes on the right indicates the third sun gear S3, the third carrier K3 second ring gear R2, the third ring gear R3 second carrier K2, and the second sun gear S2 of the second and third planetary gear sets G2, G3.

The distance between the axes in the lateral direction is determined by the gear ratio, namely the number of gear tooth. For example, the distance between the first sun gear S1 and the first carrier K1 is determined by a gear tooth number (Zr1) of the first ring gear R1/a gear tooth number (Zs1) of the first sun gear S1 in a case where the distance between the first carrier K1 and the first ring gear R1 is set to be 1 (=1.813). The distance between the third sun gear S3 and the third carrier K3 is determined by a gear tooth number (Zr3) of the third ring gear R3/a gear tooth number (Zs3) of the third sun gear S3 in a case where the distance between the third carrier K3 and the third ring gear R3 is set to be 1 (=2.220). Likewise, the distance between the second sun gear S2 and the second carrier K2 is determined by a gear tooth number (Zr2) of the second ring gear R2/a gear tooth number (Zs2) of the second sun gear S2 in a case where the distance between the second carrier K1 and the first ring gear R1 is set to be 1 (=1.618).

The above-described lines facilitates confirmation of the speed ratio of the respective speed-change elements. For example, in the first planetary gear set G1, since the first sun gear S1 is fixed (speed ratio 0), the rotation with the same rotational direction and the increased speed (speed ratio 1.55) is outputted to the first ring gear R1 (an intersection between a straight line interconnecting a fixed point of the first sun gear S1 and an input point of the first carrier K1 and an axis line of the first ring gear R1 becomes an output point) by inputting a specified rotational speed (speed ratio 1) to the first carrier K1. Herein, the outputted rotational speed from the first planetary gear set G1 can be selected by determining the output from the first ring gear R1 (speed ratio 1.55) or the output from the first carrier K1 (speed ratio 1).

In the second and third planetary gear sets G2, G3, there are four speed-change elements (D1-D4) as described above. Thus, by specifying (fixing) the speed-ratio location of two speed-change elements, the speed-ratio location of the remaining two speed-change elements is determined. For example, in a case where the first clutch C1 of the second sun gear S2 (first speed-change element D1) is made in the connection state and the second brake B2 of the second ring gear R2 third carrier K3 (third speed-change element D3), the second carrier K2 third ring gear R3 (second speed-change element D2) rotates at a slower speed than the second sun gear S2 and the third sun gear S3 (fourth speed-change element D4) rotates reversely (minus speed ratio) for idling.

The establishment of respective speeds will be described referring to FIG. 3 and FIG. 4A. The first speed is established by the first clutch C1 and the second brake B2 that are selected in the connection state. In this case, the rotation from the input shaft 1 by way of the first carrier K1 is inputted to the second sun gear S2 via the first clutch C1 (the same rotational speed as the one of the input shaft 1) as shown in FIG. 1. Since the second brake B2 is selected in the connection state and the second ring gear R2 is fixed to the transmission case Z, the rotational speed of the second carrier K2 between the second sun gear S2 and the second ring gear R2 is greatly reduced. This reduced-speed rotation is outputted from the counter drive gear 5.

The second speed is established by the first clutch C1 and the first brake B1 that are selected in the connection state. In this case, the rotation from the input shaft 1 by way of the first carrier K1 is inputted to the second sun gear S2 via the first clutch C1 like the first speed. Since the first brake B1 is selected in the connection state and the third sun gear S3 is fixed to the transmission case Z, the rotational speed of the second carrier K2 between the second sun gear S2 and the third sun gear S3 is slightly reduced. This reduced-speed rotation is outputted from the counter drive gear 5.

The third speed is established by the first clutch C1 and the third clutch C3 that are selected in the connection state. In this case, the rotation that is inputted to the second sun gear S2 from the input shaft 1 by way of the first carrier K1 and the first clutch C1 and the rotation that is inputted to the third sun gear S3 from the input shaft 1 by way of the third clutch C3 have the same rotational speed as the one of the input shaft 1. Thus, the second sun gear S2 and the third sun gear S3 rotate at the same speed. Accordingly, other speed-change elements rotate at the same rotational speed, so the second carrier K2 rotates at the same speed as well. Thereby, the rotation with the same speed as that of the input shaft 1 is outputted from the counter drive gear 5.

The fourth speed is established by the first clutch C1 and the second clutch C2 that are selected in the connection state. In this case, the rotation from the input shaft 1 is also outputted to the second sun gear S2 by way of the first carrier K1 and the first clutch C1. And, the increased-speed rotation of the first ring gear R1 is received by the second ring gear R2 via the second clutch C2, so the second carrier K2 disposed between the second sun gear S2 and the second ring gear R2 is increased in its rotational speed. This increased-speed rotation is outputted from the counter drive gear 5.

The fifth speed is established by the second clutch C2 and the third clutch C3 that are selected in the connection state. In this case, the rotation from the input shaft 1 is outputted to the second ring gear R2 by way of the first ring gear R1, the second clutch C2 and the third carrier K3. Herein, since the third sun gear S3 that is connected with the input shaft 1 via the third clutch C3 has the same speed as the rotational speed of the input shaft 1, the speed of the second carrier K2 is more increased because of location relationships between the second ring gear R2 and the third sun gear S3. This increased-speed rotation is outputted from the counter drive gear 5.

The sixth speed is established by the second clutch C2 and the first brake B1 that are selected in the connection state. In this case, the rotation from the input shaft 1 is outputted to the second ring gear R2 by way of the first ring gear R1 and the second clutch C2. Herein, since the third sun gear S3 is fixed to the transmission case Z further, the speed of the second carrier K2 is much more increased because of the location relationships between the second ring gear R2 and the third sun gear S3. Thus, the highest-speed rotation is outputted from the counter drive gear 5.

The reverse is established by the third clutch C3 and the second brake B2 that are selected in the connection state. In this case, the rotation that is outputted to the third sun gear S3 from the input shaft 1 via the clutch C3 is outputted to the third ring gear R3 with a reverse rotation because the rotation of the third carrier K3 stops. This reverse rotation is outputted from the counter drive gear 5.

Figure 5A:
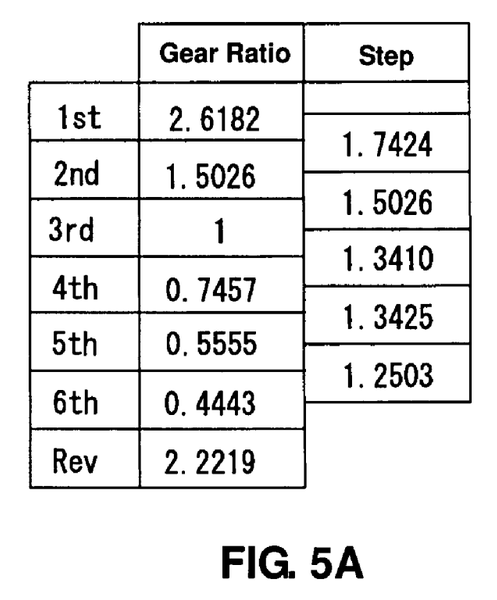
FIG. 5A is a chart of a gear ratio of respective speeds and a step between respective speeds.
Figure 5B:
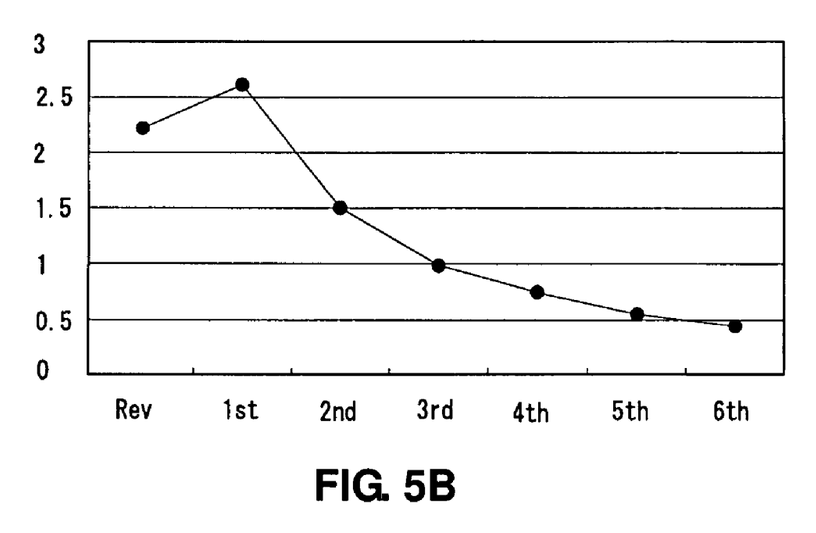
FIG. 5B is a graph of the gear ratio.
Figure 6A:
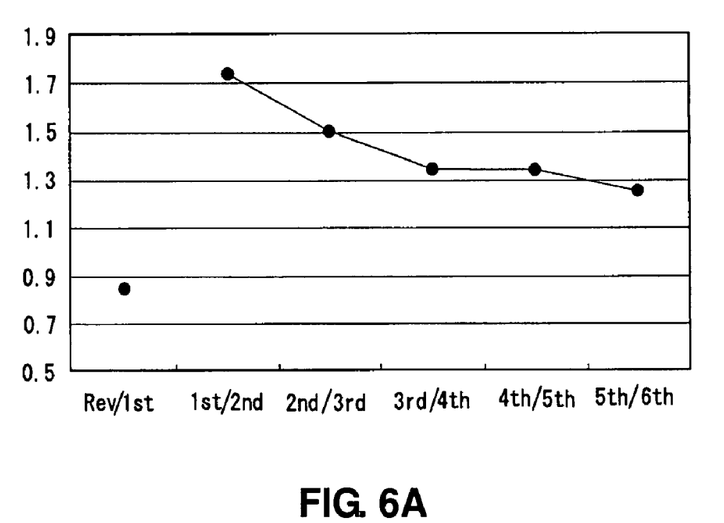
FIG. 6A is a graph of the step between respective speeds.
Figure 6B:
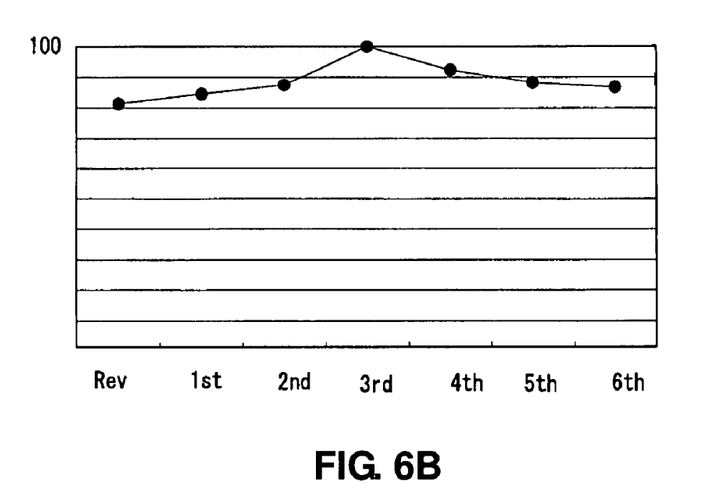
FIG. 6B is a graph of a gear loss.

The gear ratio of respective speeds, the steps between respective speeds, and the gear loss that are established as described above are as shown in a chart of FIG. 5A, and graphs of FIGS. 5B, 6A, 6B, respectively, which can provide their proper values as the automatic transmission M.

With respect to the gear ratio, for example, it is set such that the first speed is 2.6182, the second speed is 1.5026, the third speed is 1, the fourth speed is 0.7457, the fifth speed is 0.5555, the sixth speed is 0.4443, and the reverse is 2.2219, which is configured such that the higher the speed is, the less the change of the gear ratio becomes as shown in FIG. 5B. This tendency also appears in the chart of the step between the speeds, in which the step of the first and second speeds is 1.7424, the step of the second and third speeds is 1.5026, the step of the third and fourth speeds is 1.3410, the step of the fourth and fifth speeds is 1.3425, and the step of the fifth and sixth speeds is 1.2503, which is configured such that the higher the speed is, the less the change of the step between the speeds becomes as shown in FIG. 6A. By setting the gear ratio like this, the vehicle acceleration at the low speed traveling state can be improved and the comfortable vehicle riding can be attained at the high speed traveling state suppressing the shift shock properly.

Also, with respect to the gear loss (transmission loss between gears), since the single-pinion type of planetary gear sets are used, a relatively high value can be maintained as shown in FIG. 6B. Particularly, since the third speed is established by the direct connection, it provides no gear loss.

Figure 7:
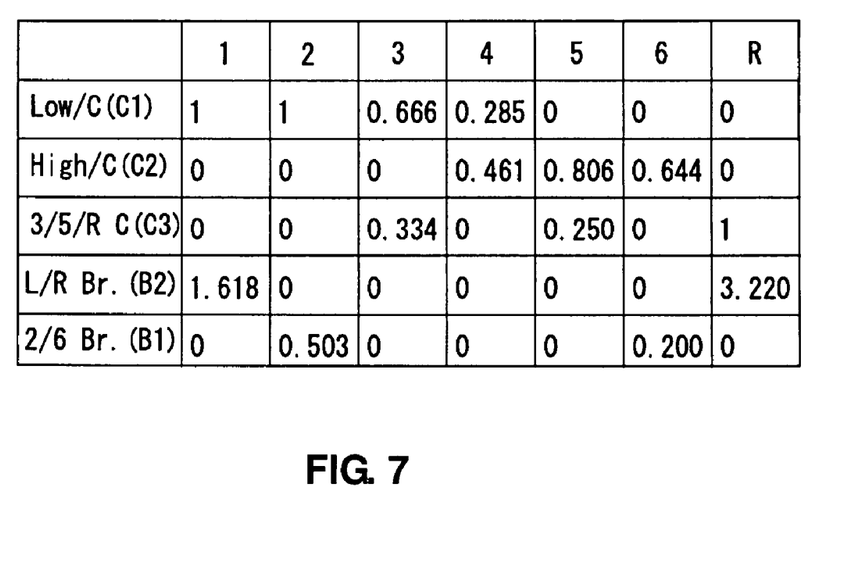
FIG. 7 is a chart showing a torque share ratio of respective clutches and brakes of respective speeds.

FIG. 7 is a chart showing a torque share ratio of respective clutches and brakes of respective speeds, namely to what extent the respective clutches C1, C2, C3 and brakes B1, B2 share the load of the drive torque of the input shaft 1. Herein, "1" means that it bears all of the drive torque of the input shaft 1, and "a value smaller than 1" means that it bears part of the drive torque of the input shaft 1 and indicates its specific extent of the bearing (share ratio). As apparent from this torque share ratio chart, the first-third clutches C1, C2, C3 shear the transmission torque with relatively low values of 1-0.250.

This is because, as described above, the first planetary gear set G1 provided upstream of the first and second clutches C1, C2 is made function as the multiplying mechanism that transmits the rotation of the input shaft 1 to the first and second clutches C1, C2 with the speed increase. Accordingly, the torque share ratio of these clutches C1, C2 is relatively low. In a case where the first planetary gear set G1 is comprised of the reduction mechanism that is shown in the above-described patent publication, the torque share ratio of these clutch C1 and the like may increase to exceeds "1."

Thus, the clutch capacity and the diameter size of the clutches, and the plate number of the multi-plate clutches can be reduced by lowering the torque share ratio of the clutches C1, C2, C3.

With respect to the brakes B1, B2, although the second brake B2 has the value exceeding "1," the normal traveling state in which the first speed or the reverse are used does not use this second brake B2 so often. Accordingly, the burden of the brake may not be increased improperly.

Thus, according to the present embodiment, since the torque share ratio of the clutches C1, C2, C3 and the brakes B1, B2 can be lowered, the clutch capacity of the clutches can be reduced and thereby the clutch size can be made small. Accordingly, the compactness of the automatic transmission M with the six forward speeds can be attained effectively.

Figure 8:
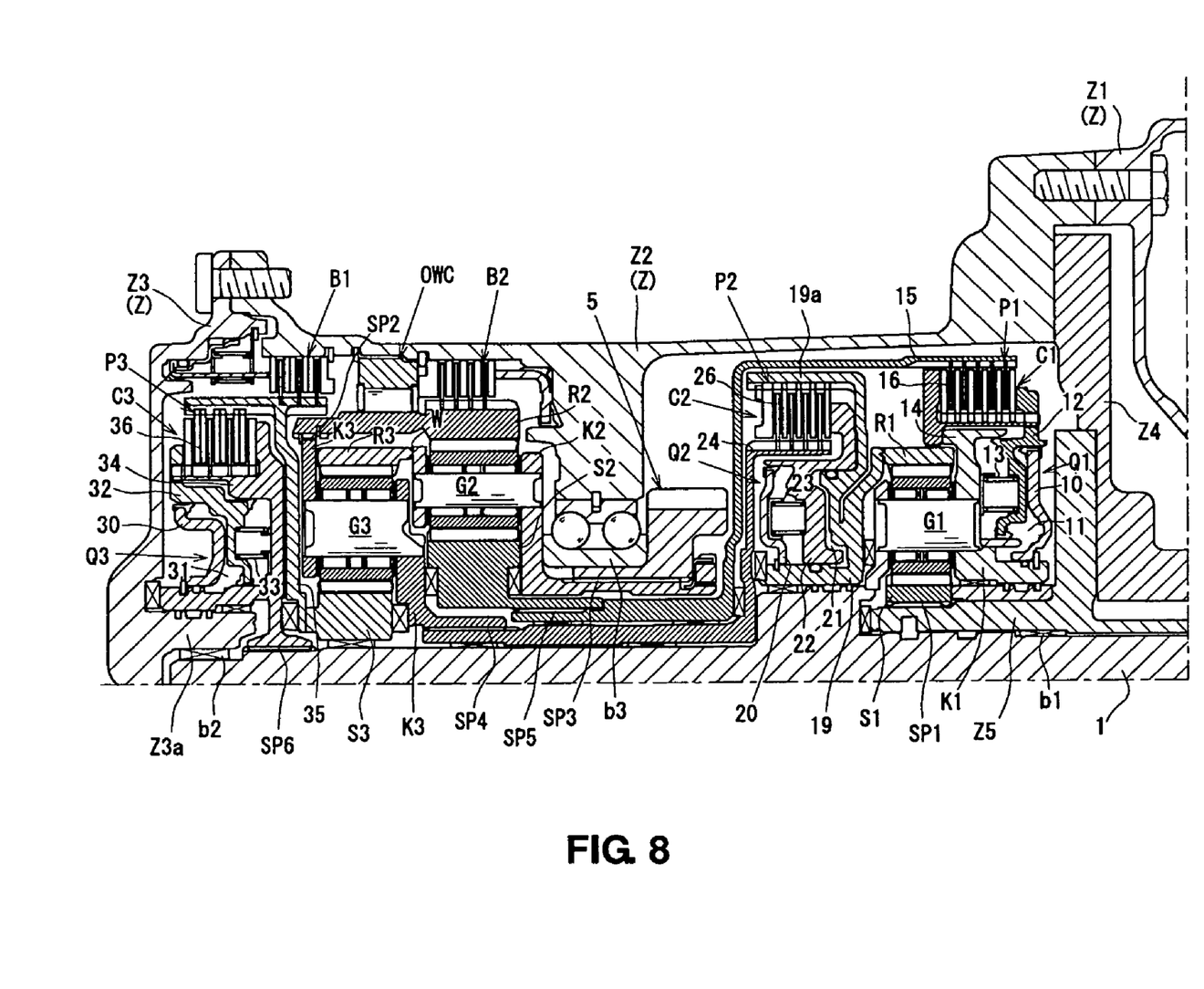
FIG. 8 is a specific sectional view of the automatic transmission.
Figure 9:
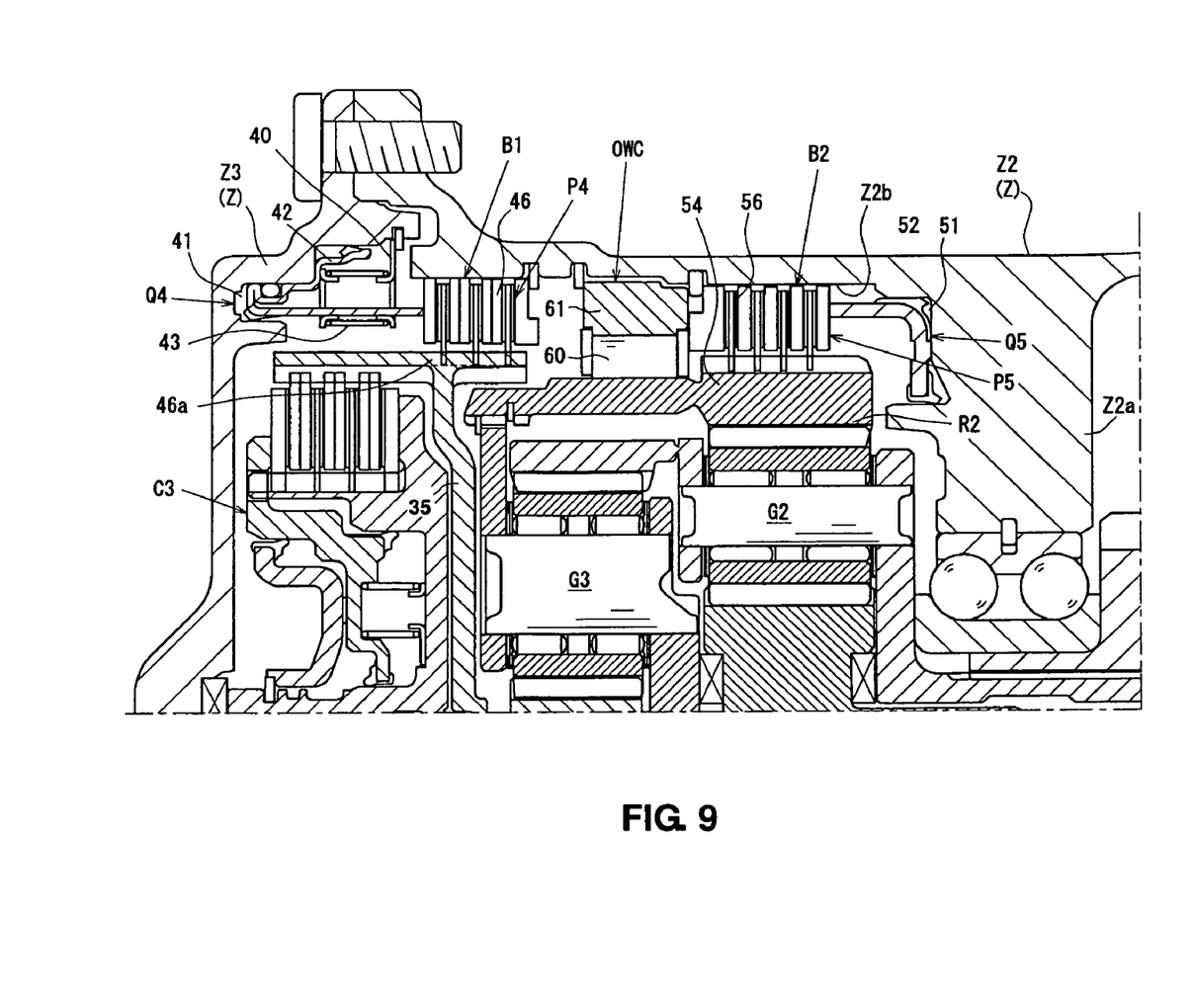
FIG. 9 is a specific sectional view of a major part of the automatic transmission.

Next, the specific structure of the automatic transmission M will be further described referring to FIGS. 8 and 9. FIG. 8 is a specific sectional view of the automatic transmission M, and FIG. 9 is a specific sectional view of a major part of the automatic transmission M. The same components as those shown in FIG. 1 will be denoted by the same reference characters, whose description is omitted.

The automatic transmission M comprises the input shaft 1, the plural gear sets G1, G2, G3, the clutches C1, C2, C3, and the brakes B1, B2 and so on, which are accommodated in the transmission case Z that comprises a converter housing Z1, a gear casing Z2 and an end cover Z3.

A front end portion of the input shaft 1 is rotatably supported via a bearing b1 at a cylindrical member Z5 that is supported at a cover member Z4 that is fixed to the gear casing Z2. A rear end portion of the input shaft 1 is rotatably supported via a bearing b2 at a boss portion Z3a that is formed at the end cover Z3.

On the input shaft 1 provided the first, second and third planetary gear sets G1, G2, G3 from the transmission forward side as described above, and the counter drive gear 5 is disposed between the first and second planetary gear sets G1, G2.

Herein, the first planetary gear set G1 is disposed so as to overlap with the above-described cylindrical member Z5 in the axial direction, and the first sun gear S1 is fixed (always fixed) to the cylindrical member Z5 via a spline connection SP1. Also, the first clutch C1 is disposed just before the first planetary gear set G1, and the second clutch C2 is disposed just behind the first planetary gear set G1.

The first clutch C1 has a hydraulic servo Q1 that comprises a seal plate 10 fixed to the first carrier K1, a piston plate 12 that is moved in the axial direction by an operating oil pressure to form a receiving chamber 11 with the seal plate 10, and a return spring 13 that pushes back the piston plate 12 to its release position when the operating oil pressure does not act. The first clutch C1 also has a multi-plate clutch (P1) that comprises a plurality of clutch plates 16 that are disposed in the axial direction between a hub member 14 that is integral with the first carrier K1 and a drum member 15 that is provided outside the hub member 14.

The second clutch C2 also has a hydraulic servo Q2 that comprises a seal plate 20 fixed to a connection member 19 that extends from the first ring gear R1, a piston plate 22 that is moved in the axial direction to form a receiving chamber 21 with the connecting member 19, and a return spring 23 pushing back the piston plate 22 to its release position. The second clutch C2 also has a multi-plate clutch (P2) that comprises a plurality of clutch plates 26 that are disposed in the axial direction between a drum portion 19a that is formed to extend upward from the connecting member 19 and a hub member 24 that is connected with the third carrier K3 so as to be provided inside the drum portion 19a.

Thus, since the first and second clutches C1, C2 are provided near the first planetary gear set G1, the rotational force can be transmitted even if the connecting members 14, 19 are short. Specifically, the rotational force can be transmitted from the first carrier K1 to the first clutch C1 by just extending the first carrier K1 outward. Also, the rotational force can be transmitted from the first ring gear R1 to the second clutch C2 by just providing the connecting member 19 extending in the radial direction.

Further, according to the present embodiment, the second clutch C2 is disposed so as not to overlap with the first planetary gear set G1 in the axial direction. Thereby, the multi-plate clutch P2 of the second clutch C2 can be located further inward, so the radial-direction size of the second clutch C2 can be compact.

The counter drive gear 5 is disposed on the transmission rearward side of the second clutch C2. By the disposition of the counter gear drive 5 at this location, the output point of the speed-change mechanism on the input shaft 1 can be located on the transmission forward side properly. Thus, the output point of the speed-change mechanism can be provided near the central location of the vehicle (see FIG. 1).

A bearing member b3 is provided on the transmission rearward side of the counter drive gear 5. The counter drive gear 5 is firmly supported by this bearing member b3, thereby preventing the counter drive gear 5 from becoming improperly inclined.

Meanwhile, the second and third planetary gear sets G2, G3 are disposed side by side on the transmission rearward side. The second carrier K2 of the second planetary gear set G2 and the third ring gear R3 of the third planetary gear set G3 are connected (always connected) with each other by welding, and the second ring gear R2 of the second planetary gear set G2 and the third carrier K3 of the third planetary gear set G3 are connected (always connected) with each other via a connecting portion SP2. Thus, the second and third planetary gear sets G2, G3 are configured to function as the speed-change unit with the four degrees of freedom as described above.

The second carrier K2 is connected (always connected) with the counter drive gear 5 via a spline connection SP3 by way of the inside of the above-described bearing member b3. Thereby, the counter drive gear 5, second carrier K2, and third ring gear R3 rotate together.

The third carrier K3 is likewise connected with the hub member 24 of the second clutch C2 that extends by way of the inside of the bearing member b3 via a spline connection SP4. The second carrier K2 is likewise connected with the drum member 15 of the first clutch C1 that extends by way of the inside of the bearing member b3 via a spline connection SP5.

The third sun gear S3 is supported rotatably on the input shaft 1, and connected with the third clutch C3 and the first brake B1 via a drum connecting member 35 that extends outward.

The third clutch C3 is disposed on the transmission rearward side of the third planetary gear set G3. The third clutch C3 has a hydraulic servo Q3 that comprises a seal plate 30 fixed to a hub portion 34 that is fixed to the input shaft 1 via a spline connection SP6, a piston plate 32 that is moved in the axial direction to form a receiving chamber 31 with the seal plate 30, and a return spring 32 pushing back the piston plate 32 to its release position. The third clutch C3 has a multi-plate clutch P3 that comprises a plurality of clutch plates 36 that are disposed between the hub portion 34 and the drum connecting member 35.

Since the third clutch C3 is provided near the third planetary gear set G3, the rotational force can be transmitted even if the connecting member is short. Specifically, just by connecting the third sun gear S3 to the drum connecting member 35, the rotational force can be transmitted to the third sun gear S3 from the third clutch C3.

Also, the third clutch C3 is disposed so as not to overlap with the third planetary gear set G3 in the axial direction. Thereby, the multi-plate clutch P3 of the third clutch C3 can be located inward further, so the radial-direction size of the third clutch C3 can be compact.

Outside the second and third planetary gear sets G2, G3 are provided the second brake B2, one-way clutch OWC, and first brake B1 in order from the transmission forward side (hereinafter, see FIG. 9).

The second brake B2 has a hydraulic servo Q5 that comprises a piston plate 52 that forms a receiving chamber 51 with a partition wall Z2a of the gear casing Z2, a return spring, not illustrated, and a stopper plate, not illustrated. The second brake B2 has a multi-plate clutch P5 that comprises a plurality of clutch plates 56 that are disposed between a hub portion 54 that is integral with the second ring gear R2 and an inner wall portion Z2b of the gear casing Z2.

The one-way clutch OWC has an inner lace 60 that is fixed to the hub portion 54 that is integral with the second sun gear S2, and an outer lace 61 that is fixed to the inner wall portion Z2b of the gear casing Z2, thereby allowing a rotation only in a one direction.

The first brake B1 has a hydraulic servo Q4 that comprises a piston plate 42 that forms a receiving chamber 41 with the end cover Z3, a return spring 43 that pushes back the piston plate 42 to its release position, and a stopper plate 40 that supports the return spring 43. The first brake B1 has a multi-plate clutch P4 that comprises a plurality of clutch plates 46 that are disposed between an outside hub portion 46a of the drum connecting member 35 and the inner wall portion Z2b of the gear casing Z2.

Thus, since the second brake B2, first brake B1 and one-way clutch OWC are provided outside the second and third planetary gear sets G2, G3, a particular layout space for these members B2, B1, OWC is not necessary, so that the length of the automatic transmission M can be compact.

Particularly, there may be no need to consider the transmission torque capacity of the brakes. Accordingly, even if the brakes are provided outside the second and third planetary gear sets G2, G3, the radial-direction size of the automatic transmission M can be made short and compact as well.

Next, operations and effects of the above-described present embodiment will be described. According to the automatic transmission M of the present embodiment, by fixing the first sun gear S1 to the gear casing Z2 via the cylindrical member 16 and fixing the first carrier K1 to the input shaft 1, the first planetary gear set G1 receiving the input rotation can be made function as the so-called multiplying mechanism. Further, since the downstream speed-change elements comprises the second and third planetary gear sets G2, G3, the speed-change elements can be configured without using the long pinion. Thereby, the drive torque transmitted to the first and second clutches C1, C2 located downstream of the first planetary gear set G1 is not increased from the input torque, and the drive torque transmitted to the downstream gear trains is not increased either. Also, since the improper inclination of gears may not occur because of no application of the long pinion, the gear noises can be restrained.

Thus, there can be provided the automatic transmission M for six forward speeds with the plural planetary gear sets G1, G2, G3, clutches C1, C2, C3 and brakes B1, B2 that can properly reduce the clutch capacity and restrain gear noises with its compact and the light-weighted structure.

Also, according to the present embodiment, the third speed is configured such that the rotation of the input shaft 1 is directly outputted from the counter drive gear 5 with the same rotational speed. Thereby, the rotational speed of the fourth through sixth speeds that may be used often in the normal driving condition can be higher than the one of the input shaft 1. Accordingly, the drive torque acting on the gear trains of the automatic transmission M can be reduced as a whole, thereby reducing the load acting on the gear trains. Thus, the durability of the gear trains can be enhanced with the light-weighted and compact structure of the automatic transmission M.

Further, according to the present embodiment, the first, second and third planetary gear sets G1, G2, G3 are provided on the input shaft 1 in order from the transmission forward side near the engine E, and the counter drive gear 5 is provided between the first and second planetary gear sets G1, G2.

Thereby, the drive torque can be outputted to the countershaft 2 at the central location of the vehicle. Accordingly, the countershaft 2 that interconnects the final driven gear 8 of the differential gear device 9 and the counter driven gear 6 can be made properly short, thereby making the automatic transmission M compact further. Particularly, since only the planetary gear set G1 is disposed between the engine E and the counter drive gear 5 other than the torque converter 4, the countershaft 2 can be made shorter. Thus, a whole part of the drive system can be made compact. Herein, although the present embodiment applies to the transmission system in which the drive force is transmitted between the counter drive gear 5 and the counter driven gear 6, another system, such as a chain transmission system using a chain and sprockets, may be used.

Also, according to the present embodiment, the first and second clutches C1, C2 are disposed near the first planetary gear set G1. Thereby, the connecting member between the first planetary gear set G1 and each of the clutches C1, C2 can be made properly short. Thus, there can be provided a layout that is advantageous to the compactness of the automatic transmission M.

Further, according to the present embodiment, the second clutch C2 is disposed so as not to overlap with the first planetary gear set G1 in the axial direction. Thereby, the radial-direction size of the second clutch C2 can be made small without any restriction by the first planetary gear set G1. Thus, the radial-direction size of the second clutch C2 can be compact, thereby making the automatic transmission M compact. In the case where the first clutch C1 is disposed so as not to overlap with the first planetary gear set G1 in the axial direction, the same effect can be provided as well.

Also, according to the present embodiment, the third clutch C3 is disposed near the third planetary gear set G3. Thereby, the connecting member between the third planetary gear set G3 and the third clutch C3 can be made properly short. Thus, there can be provided the layout that is advantageous to the compactness of the automatic transmission M.

Further, according to the present embodiment, the third clutch C3 is disposed so as not to overlap with the third planetary gear set G3 in the axial direction. Thereby, the radial-direction size of the third clutch C3 can be made small without any restriction by the third planetary gear set G3.

Thus, the radial-direction size of the third clutch C3 can be compact, thereby making the automatic transmission M compact.

Also, according to the present embodiment, the first and second brakes B1, B2 are disposed side by side in the axial direction outside the second and third planetary gear sets G2, G3. Thereby, the brakes B1, B2, the torque capacity of which may not need to be cared about, can be properly located utilizing the space outside the second and third planetary gear sets G2, G3. Particularly, since there may be no need to keep the space for the brakes B1, B2 in the axial direction, the axial-direction length (whole length) of the automatic transmission M can be short. Thus, the automatic transmission M can be made compact further.

Embodiment 2

Figure 10:
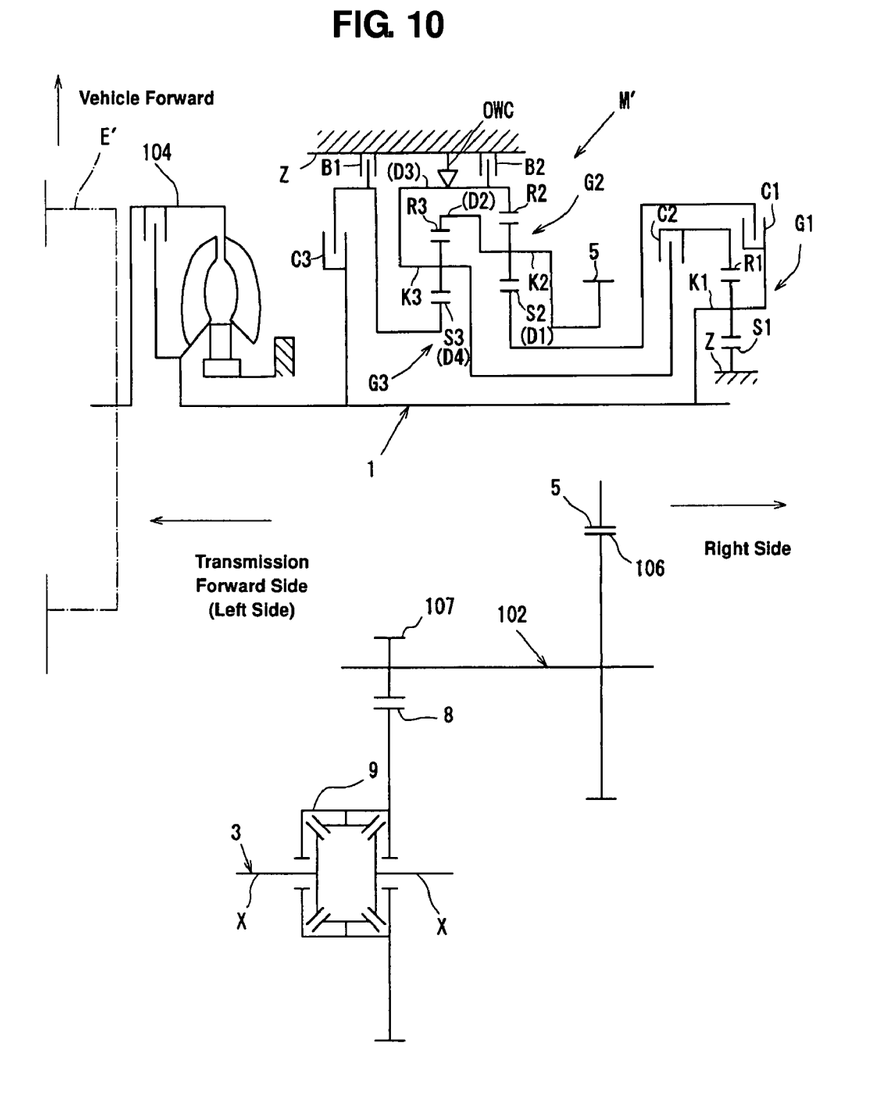
FIG. 10 is a skeleton diagram of a power train of an automatic transmission of a second embodiment according to the present invention.

A second embodiment will be described referring to FIG. 10. FIG. 10 is a skeleton diagram of a power train, which corresponds to FIG. 1. The same components will be denoted by the same reference characters, whose description is omitted.

In the present embodiment, an engine E' and a torque converter 104 are disposed on the left side of the vehicle, and the first, second, third planetary gear sets G1, G2, G3 are disposed in order from the right side on the input shaft 1, like the above-described first embodiment.

Namely, an automatic transmission M' of the present embodiment has an opposite-side layout structure to that of the first embodiment in such a manner that the third planetary gear set G3 is located on the transmission forward side.

Thus, the counter drive gear 5 is located slightly outside in the vehicle width direction, and a counter driven gear 106 on a countershaft 102 is also located slightly outside. Herein, a disposition location of the counter driven gear 106 and a final driven gear 107 on the countershaft 102 is opposite to that of the first embodiment.

According to the present embodiment, the first, second and third planetary gear sets G1, G2, G3 are provided on the input shaft 1 in order from the side that is far from the engine E', and the counter drive gear 5 is provided between the first and second planetary gear sets G1, G2. Thereby, the drive torque can be outputted relatively near the engine E', namely, at the central location of the vehicle. Accordingly, the countershaft 102 can be made properly shorter, thereby making the automatic transmission M' compact. Thus, the whole part of the drive system can be made compact. The other operations and effects are the same as those of the first embodiment.

Herein, correspondence relationships of the structure of the present invention to the above-described embodiments are as follows. The output portion corresponds to the counter drive gear 5. The first single-pinion-type planetary gear set corresponds to the first planetary gear set G1. The second single-pinion-type planetary gear set corresponds to the second planetary gear set G2. The third single-pinion-type planetary gear set corresponds to the third planetary gear set G3.

The present invention should not be limited to the above-described embodiment, but any other modifications and improvements may be applied within the scope of a spirit of the present invention.

What is claimed is:
1. An automatic transmission, comprising:
an input shaft;
an output portion, the output portion being provided so as to be coaxial with said input shaft;
a transmission case;
a first single-pinion-type planetary gear set including a first sun gear, a first carrier, and a first ring gear;
a second single-pinion-type planetary gear set including a second sun gear, a second carrier, and a second ring gear;
a third single-pinion-type planetary gear set including a third sun gear, a third carrier, and a third ring gear;
a first clutch operative to connect or disconnect said input shaft with said second sun gear;
a second clutch operative to connect or disconnect said first ring gear with said third carrier;
a third clutch operative to connect or disconnect said input shaft with said third sun gear;
a first brake operative to connect or disconnect said third sun gear with said transmission case; and
a second brake operative to connect or disconnect said third carrier with said transmission case,
wherein said first sun gear and said transmission case, said first carrier and said input shaft, said second ring gear and said third carrier, and said third ring gear and said second carrier and said output portion are respectively configured to be always in a connection state, and
a first speed is established by said first clutch and said second brake that are respectively selected in a connection state, a second speed is established by said first clutch and said first brake that are respectively selected in a connection state, a third speed is established by said first clutch and said third clutch that are respectively selected in a connection state, a fourth speed is established by said first clutch and said second clutch that are respectively selected in a connection state, a fifth speed is established by said second clutch and said third clutch that are respectively selected in a connection state, and a sixth speed is established by said second clutch and said first brake that are respectively selected in a connection state.

2. The automatic transmission of claim 1, wherein said third speed is configured such that a rotation of said input shaft is directly transmitted to said output portion.

3. The automatic transmission of claim 1, wherein said first, second and third single-pinion-type planetary gear sets are provided on said input shaft in order from one end of the input shaft that is connected to an engine, and said output portion is provided between said first single-pinion-type planetary gear set and said second single-pinion-type planetary gear set.

4. The automatic transmission of claim 3, wherein said first and second clutches are disposed near said first single-pinion-type planetary gear set.

5. The automatic transmission of claim 4, wherein at least either one of said first and second clutches is disposed so as not to overlap with said first single-pinion-type planetary gear set in an axial direction.

6. The automatic transmission of claim 3, wherein said third clutch is disposed near said third single-pinion-type planetary gear set.

7. The automatic transmission of claim 6, wherein said third clutch is disposed so as not to overlap with said third single-pinion-type planetary gear set in an axial direction.

8. The automatic transmission of claim 3, wherein said first and second brakes are disposed side by side in an axial direction outside said second and third single-pinion-type planetary gear sets.

9. The automatic transmission of claim 1, wherein said first, second and third single-pinion-type planetary gear sets are provided on said input shaft in order from an end of the input shaft that is opposite to one end of the input shaft that is connected to an engine, and said output portion is provided between said first single-pinion-type planetary gear set and said second single-pinion-type planetary gear set.

10. The automatic transmission of claim 9, wherein said first and second clutches are disposed near said first single-pinion-type planetary gear set.

11. The automatic transmission of claim 10, wherein at least either one of said first and second clutches is disposed so as not to overlap with said first single-pinion-type planetary gear set in an axial direction.

12. The automatic transmission of claim 9, wherein said third clutch is disposed near said third single-pinion-type planetary gear set.

13. The automatic transmission of claim 12, wherein said third clutch is disposed so as not to overlap with said third single-pinion-type planetary gear set in an axial direction.

14. The automatic transmission of claim 9, wherein said first and second brakes are disposed side by side in an axial direction outside said second and third single-pinion-type planetary gear sets.

15. An automatic transmission, comprising:
   an input shaft;
   an output portion, the output portion being provided so as to be coaxial with said input shaft;
   a transmission case;
   a first single-pinion-type planetary gear set including a first sun gear, a first carrier, and a first ring gear;
   a second single-pinion-type planetary gear set including a second sun gear, a second carrier, and a second ring gear;
   a third single-pinion-type planetary gear set including a third sun gear, a third carrier, and a third ring gear;
   a first clutch operative to connect or disconnect said input shaft with said second sun gear;
   a second clutch operative to connect or disconnect said first ring gear with said third carrier;
   a third clutch operative to connect or disconnect said input shaft with said third sun gear;
   a first brake operative to connect or disconnect said third sun gear with said transmission case; and
   a second brake operative to connect or disconnect said third carrier with said transmission case,
   wherein said first sun gear and said transmission case, said first carrier and said input shaft, said second ring gear and said third carrier, and said third ring gear and said second carrier and said output portion are respectively configured to be always in a connection state,
   a first speed is established by said first clutch and said second brake that are respectively selected in a connection state, a second speed is established by said first clutch and said first brake that are respectively selected in a connection state, a third speed is established by said first clutch and said third clutch that are respectively selected in a connection state, a fourth speed is established by said first clutch and said second clutch that are respectively selected in a connection state, a fifth speed is established by said second clutch and said third clutch that are respectively selected in a connection state, and a sixth speed is established by said second clutch and said first brake that are respectively selected in a connection state, and
   said third speed is configured such that a rotation of said input shaft is directly transmitted to said output portion.

16. The automatic transmission of claim 15, wherein said first, second and third single-pinion-type planetary gear sets are provided on said input shaft in order from one end of the input shaft that is connected to an engine, and said output portion is provided between said first single-pinion-type planetary gear set and said second single-pinion-type planetary gear set.

17. The automatic transmission of claim 15, wherein said first, second and third single-pinion-type planetary gear sets are provided on said input shaft in order from an end of the input shaft that is opposite to one end of the input shaft that is connected to an engine, and said output portion is provided between said first single-pinion-type planetary gear set and said second single-pinion-type planetary gear set.

* * * * *